(12) United States Patent
Hoddie

(10) Patent No.: US 6,222,549 B1
(45) Date of Patent: Apr. 24, 2001

(54) METHODS AND APPARATUSES FOR TRANSMITTING DATA REPRESENTING MULTIPLE VIEWS OF AN OBJECT

(75) Inventor: J. Peter Hoddie, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/002,175

(22) Filed: Dec. 31, 1997

(51) Int. Cl.[7] .................................................. G00F 15/00
(52) U.S. Cl. .............................................................. 345/419
(58) Field of Search .................................. 345/419, 433, 345/426, 427, 429, 430, 117, 121

(56) References Cited

U.S. PATENT DOCUMENTS

| | | | |
|---|---|---|---|
| 5,019,809 | 5/1991 | Chen | 340/815.31 |
| 6,014,472 | * 1/2000 | Minami et al. | 345/426 |

OTHER PUBLICATIONS

Kamahara E.A., "A News on Demand System with Automatic Program Composition and Qos Control Mechanism," *International Journal of Information Technology*, vol. 2, No. 1 (Jun. 1996), pp. 1–22, XP–002098728.

Kazuaki Tanaka et al., "KANTAN Video Image Retrieval User Interface," *Hitachi Review*, vol. 45, No. 2 (Apr. 1996), pp. 95–100, XP–000622841.

* cited by examiner

*Primary Examiner*—Phu K. Nguyen
(74) *Attorney, Agent, or Firm*—Blakely, Sokoloff, Taylor & Zafman

(57) ABSTRACT

Methods and apparatuses for transmitting data representing different views of an object and for receiving and using data representing different views of an object. In one method according to the present invention for transmitting data, the method stores a predetermined order of views of the object according to a viewing preference of a viewer and transmits the data representing the different views in the predetermined order. In another method according to the present invention for receiving and using data representing different views of an object, the method receives a first set of views which represent at least one first predetermined view of the object and receives a second set of views which represent at least one second predetermined view of the object. The second set is received after the first set is received according to a predetermined order which is based on a viewing preference of a viewer.

49 Claims, 13 Drawing Sheets

| Latitude | Longitudes | |
|---|---|---|
| 0° | 0° ; 90° ; 180° ; 270° | 21 |
| +15° | 0° ; 90° ; 180° ; 270° | 22 |
| −15° | "                 " | 23 |
| +30° | "                 " | 24 |
| −30° | "                 " | 25 |
| +60° | "                 " | 26 |
| −60° | "                 " | 27 |
| +75° | "                 " | 28 |
| −75° | 0° ; 90° ; 180° ; 270° | 29 |
| +90° | 0° | 30 |
| −90° | 0° | 31 |

(PRIOR ART)

METHODS AND APPARATUSES FOR TRANSMITTING DATA REPRESENTING MULTIPLE VIEWS OF AN OBJECT

BACKGROUND OF THE INVENTION

1. Field of the Invention

The present invention relates to methods and apparatuses for transmitting data representing multiple views of an object. More particularly, the present invention relates to methods and apparatuses for transmitting multiple views of an object over a network of computer systems.

2. Background Information

Digital processing systems, such as conventional computer systems, can often display various different views of an object on a display device which is coupled to the digital processing system. In many such systems, the user of the system may manipulate the object in such a way to see various views of the object. The views, in one example, may be considered to be obtained from the surface of a virtual sphere which surrounds the object. FIG. 1A shows a virtual sphere 10 which surrounds an object 9. The different views of the object may be considered to be taken from various points on the surface of the virtual sphere 10. The virtual sphere 10 includes an equator 12 and a meridian or longitudinal line 14. Point 15b represents the north pole of the virtual sphere and point 15a represents the south pole of the virtual sphere. Points 16, 17, 18, and 19 on the equator 12 represent the locations 0°, 90°, 180°, and 270° respectively along the equator. If the view at point 16 along the equator 12 is considered to be a front view of the object 9, which is shown as a house, then the view from point 18 is a rear view while views from points 17 and 19 are views of the right and left sides respectively. A view from the north pole shows the roof of the house, and a view from the south pole shows the bottom of the house.

Various methods exist in the prior art for manipulating such an object in order to see various views of the object. For example, U.S. Pat. No. 5,019,809 by Michael Chen describes a method for direct manipulation of an object by using a two dimensional cursor control device, such as a mouse, to simulate three dimensional movement over the surface of a virtual sphere in order to see views of the object which is surrounded by the virtual sphere. Other methods, such as the use of sliders displayed on the screen or physical, mechanical sliders which may be manipulated by a user are also well known in the art. These various techniques allow a user to rotate or otherwise manipulate the object in order to see various different views of the object.

It is well known in the art that these views may be used to make a sequence of views which appears to be a movie. Typically these views are displayed in a particular sequence which makes the object appear to be smoothly rotating. For example, the house 9 at the center of the virtual sphere 10 may appear to rotate on an axis defined by the north and south pole. This "movie" is merely the playback of various views of the object taken along the equator 12 in sequence from point 16, through points 17, 18, and 19 and back to point 16. This "movie" may be further enhanced by providing views at different latitudes. FIG. 1B shows an example of the various views which may be provided at each selected latitude. Table 35 includes rows 21 through 31, each of which specify at least one longitude for each latitude. For example, row 21 shows that at latitude 0 (along the equator) at least four views are shown; in this case, the views are from points 16, 17, 18, and 19 of FIG. 1A. It will be appreciated that additional views may be obtained and stored to provide greater resolution along each latitude. For example, views at every 5° or 10° along each latitude provides greater resolution of the object and also makes any "movie" seem more realistic. It will also be appreciated that additional views along additional latitudes may be stored in order to provide greater resolution in the north and south directions.

Table 35 of FIG. 1B represents a typical way in the prior art in which the various views are stored and transmitted between systems. Essentially, the views are stored in circular passes of the object at various vertical levels along the north/south axis. Typically, the physical arrangement of the data in a storage device reflects a similar arrangement of the data, which arrangement is often the manner in which the data is originally captured from the object. For example, a camera may be positioned at each of the different viewpoints in series and the data from the camera may be stored in this order such that there are essentially circular passes of the object at various vertical levels which are captured and stored on a storage device, such as a hard disk or other computer readable media.

On a storage device which has random access capabilities and which provides reasonably fast rates of data retrieval, this storage arrangement provides adequate data rates such that a "movie" may be displayed from these various views. However, if this data is stored in a remote location and is accessed through a network or through a slow input/output port, then storage of this data in this arrangement does not provide adequate or satisfactory display of the object, particularly when the object is to be displayed as a "movie" which may be referred to as an "object movie". This often happens in the case of transmission of objects through the Internet or other networks.

FIG. 2A shows several computer systems which are coupled together through the Internet 103. It will be appreciated herein that the term "Internet" refers to a network of networks which uses certain protocols (e.g. the TCP/IP protocol and possibly other protocols such as HTTP (hypertext transfer protocol) for HTML (hypertext markup language) documents). The physical connections of the Internet and the protocols and communication procedures of the Internet are well known to those in the art. Access to the Internet 103 is typically provided by Internet service providers (ISP's) such as ISP's 105 and 107. Users on client systems, such as client computer systems 121, 125, 135, and 137 obtain access to the Internet through the Internet service providers. Access to the Internet allows users of the client computer systems to exchange information, receive and send e-mails, and view objects, and manipulate these objects as they are received. For example, web server system 109 may contain data representing the object 9 shown in FIG. 1A and provide this data to a client computer system such as client system 121 upon request by the client system 121. Often these web servers are provided by ISPs, such as ISP 105, although a computer system may be set up and connected to the Internet without that system also being an ISP as is well known in the art.

The web server system 109 is typically at least one computer system which operates as a server computer system and is configured to operate with the protocols of the World Wide Web (WWW) and is coupled to the Internet. Optionally, the web server 109 may be part of an ISP which provides access to the Internet for client systems. The web server 109 is shown coupled to other computers in the Internet 103. Client computer systems 121, 125, 135, and 137 may each, with the appropriate web browsing software, view HTML pages provided by the web server 109. These web pages may provide movies, such as QuickTime movies, which may be viewed by users of the particular client computer system.

The ISP 105 provides Internet connectivity for the client computer system 121 through the modem interface 123 which may be considered part of the client computer system 121. The client computer system may be a conventional computer system such as a Macintosh computer, a "network" computer, a Web TV system, or other types of digital processing systems, such as a cellular telephone having digital processing capabilities. Similarly, the ISP 107 provides Internet connectivity for client systems 125, 135, and 137, although as shown in FIG. 2A, the connections are not the same for these three computer systems. Client system 125 is coupled through a modem interface 127 while client computer systems 135 and 137 are part of a Local Area Network (LAN). While FIG. 2A shows the interfaces 123 and 127 as a modem, it will be appreciated that each of these interfaces may be an analog modem, an ISDN modem, a cable modem, a satellite transmission interface (e.g. "Direct PC"), or other interfaces for coupling a computer system or a digital processing system to other digital processing systems. Client computer systems 135 and 137 are coupled to a LAN bus 133 through network interfaces 139 and 141, which may be an Ethernet network interface or other network interfaces. The LAN bus is also coupled to a gateway computer system 131 which may provide firewall and other Internet related services for the local area network. This gateway computer system 131 is coupled to the ISP 107 to provide Internet connectivity to the client computer systems 135 and 137. The gateway computer system 131 may be a conventional server computer system. Also, the web server system 109 may be a conventional server computer system.

Even with modern, high-speed analog modems, data transmission rates through the Internet are often painfully slow. Thus, a user of a client system may request a movie of an object or request the various views representing an object to allow the user to inspect the object. This request will be processed by a server system or some other digital processing system and the data will be transmitted to the requesting client system. This data will be transmitted to the client system in the order shown in FIG. 1B which is typically also the same order used to play back a movie of the object as described above. For example, a series of views along the equator beginning at 0° and progressing consecutively at 5° increments back to 0° may be transmitted from the server system to a client system. In this particular example, 72 different views along the virtual sphere surrounding the object will be transmitted to the client system in series beginning from 0° and ending at 355°. Since each of these views is often high resolution digital data, the transmission of all 72 views can take a considerable amount of time. In order for a user to view the object at, for example, 245°, the user must wait for many views to be transmitted. The data for this "object movie" is not accessible in a random (or seekable) way; that is, the order is fixed and can only be accessed in this fixed order rather than in a random access manner. This order of transmission is also the same as the order of the playback of the "object movie." Therefore, it is desirable to provide methods and apparatuses for improved transmission of data representing views of an object.

Previous attempts at solving the problem caused by slow data transfer rates have included techniques for providing streaming movie data which is provided first at a lower resolution within each frame and then at a higher resolution within each frame. That is, a particular frame is first provided at a lower resolution and then data is later provided at a higher resolution for the same frame, and this higher resolution version of the frame replaces the prior version of the frame. Similarly, another approach in the prior art attempts to solve this problem by first providing frames at a lower frame rate, such as 10 frames per second, and then transmitting other frames during that same second. Both of these approaches maintain the order of the data such that the various frames are transmitted in the same sequence in which they are shown when the movie is played back. While this may be effective for conventional movies, it is not effective or satisfactory for a "movie" of an object as described herein.

SUMMARY OF THE INVENTION

The present invention discloses methods and apparatuses for transmitting data representing different views of an object. These methods and apparatuses include methods and apparatuses for receiving systems or client computer systems and for transmitting systems or server computer systems.

A method in one example of the invention stores a predetermined order of views of the object according to a viewing preference of a viewer, and transmits data representing the different views in the predetermined order.

A method in another example of the invention receives and uses the data representing different views of an object. A first set of views which represent at least one first predetermined view of the object is received, then a second set of views which represent at least one second predetermined view of the object is received after the first set of views is received, according to a predetermined order which is based on a viewing preference of a viewer.

In one particular embodiment of the invention, the predetermined order of transmission is different than the playback order of views when a "movie" is generated from the views at a client system which has received data representing the views.

Computer systems which practice the methods of the invention are also described. Further, computer readable media having software which allows the computer systems to perform the methods of the present invention are described.

BRIEF DESCRIPTION OF THE DRAWINGS

FIG. 1B shows a table indicating the storage of data for an object according to the prior art.

DETAILED DESCRIPTION

Figure 1A:
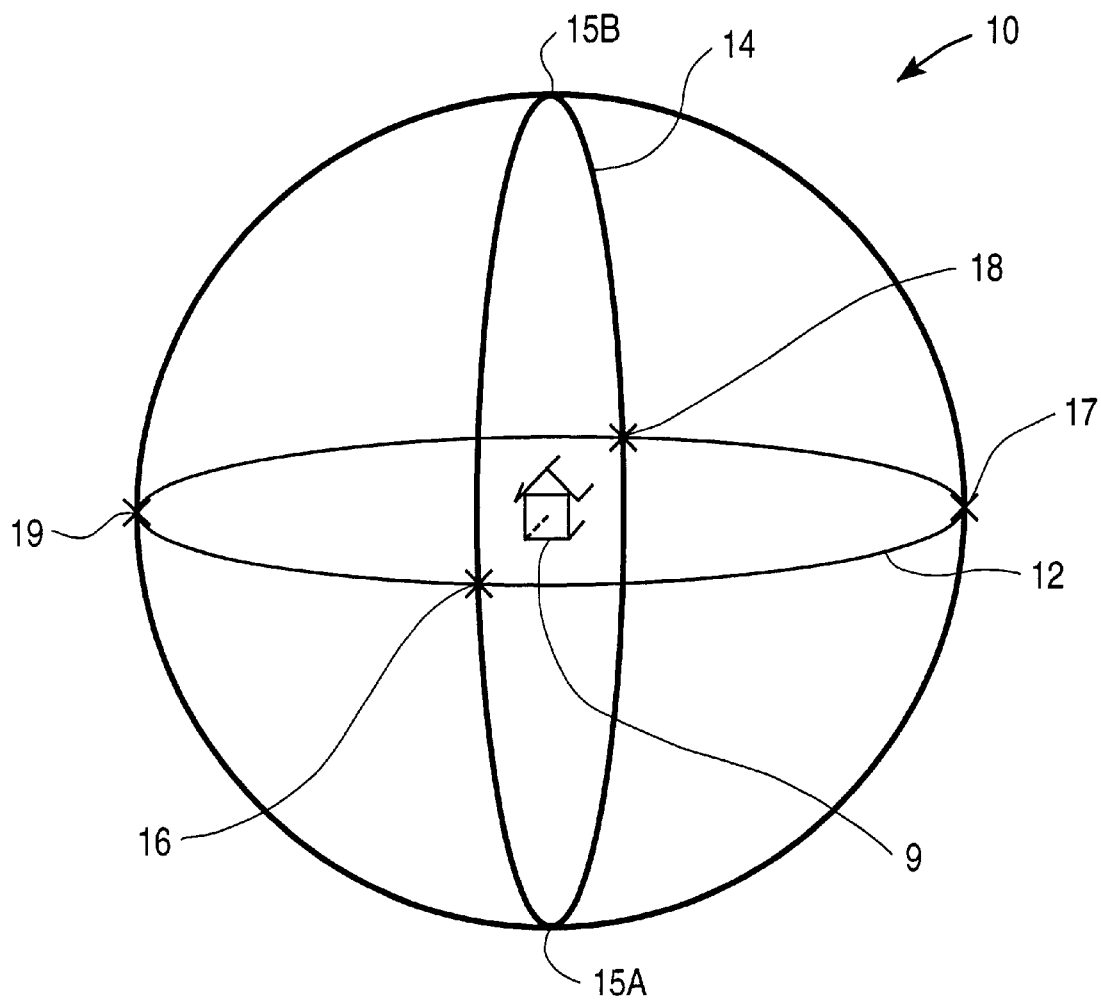
FIG. 1A shows a virtual sphere which surrounds an object.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

Figure 2A:
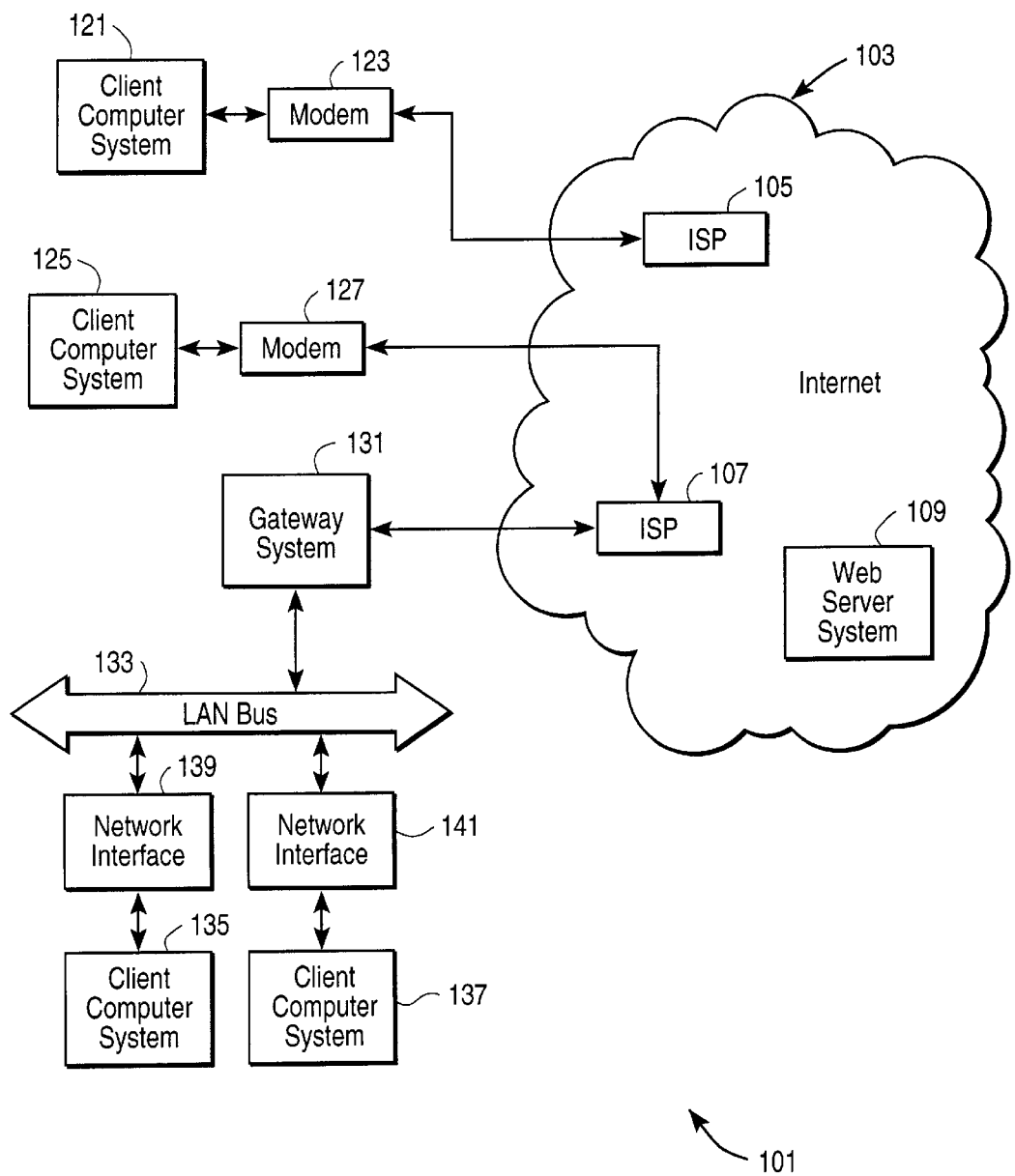
FIG. 2A shows a n example of several client computer systems coupled to the Internet.
Figure 2B:
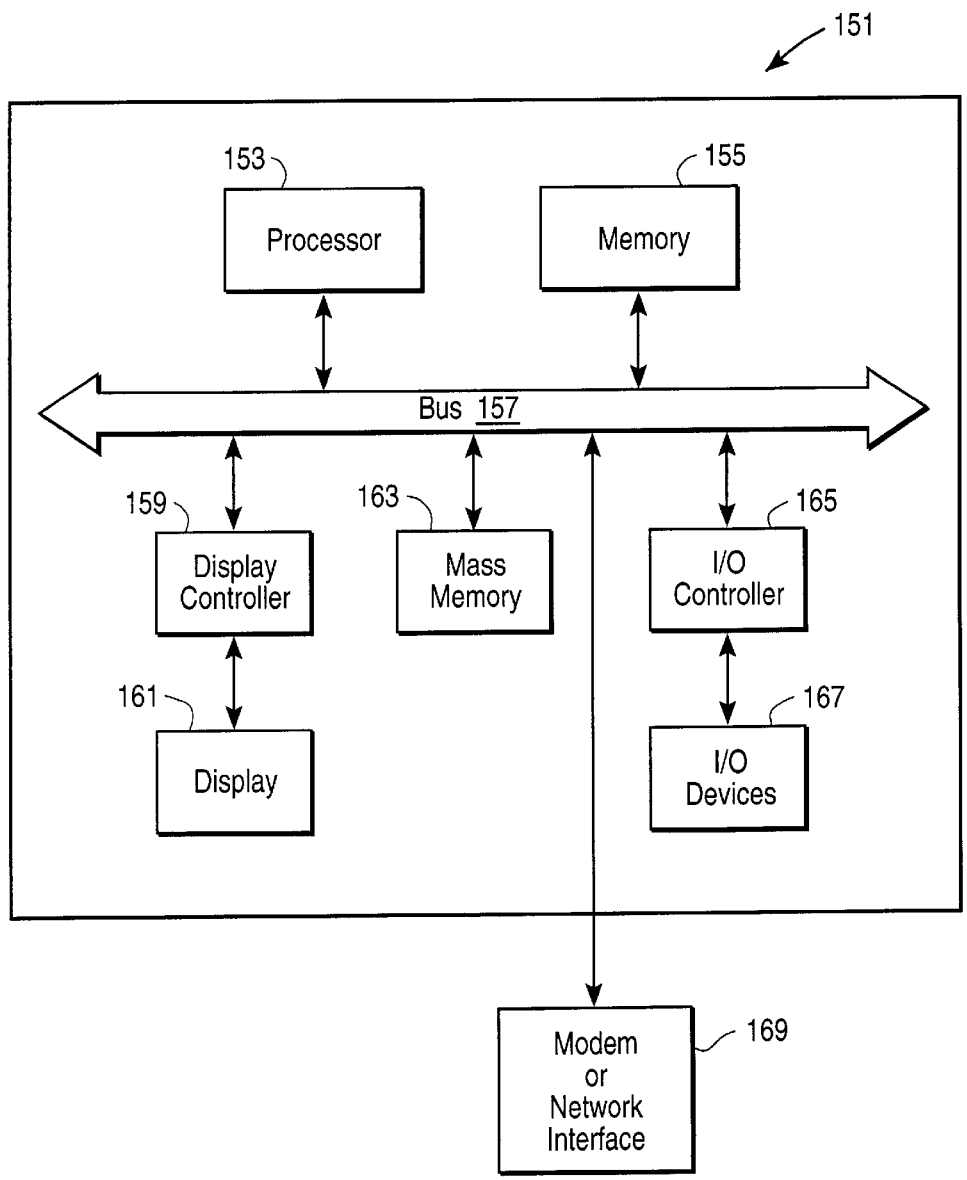
FIG. 2B shows an example of a computer system which may be used with the present invention.

FIG. 2B shows one example of a conventional computer system which may be used as a server computer system or as a client computer system or as a web server computer system. It will be appreciated that such a computer system may be used to perform many of the functions of an Internet service provider, such as ISP 105. The computer system 151 interfaces to external systems through a modem or network interface 169. It will be appreciated that the modem or network interface 169 may be considered part of the computer system 151. This interface 169 may be an analog modem, an ISDN modem, a cable modem, a token ring interface, a satellite transmission interface (e.g. "Direct PC"), or other interfaces for coupling a digital processing system to other digital processing systems. The computer system 151 includes a processor 153 which may be a conventional microprocessor, such as a Motorola PowerPC microprocessor or an Intel Pentium microprocessor. Memory 155 is coupled to the processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165. Display controller 159 controls in the conventional manner a display on the display device 161 which may be a CRT or a liquid crystal display device. The input/output devices 169 may include a keyboard, disk drives, printers, a scanner, a digital camera, and other input and output devices, including a mouse or other pointing device. The display controller 159 and the I/O controller 165 may be implemented with conventional well known technology. The mass memory 163 is often a magnetic hard disk, an optical disk, or another form of storage for large amounts of data. Some of this data is often written, by a direct memory access process, into memory 155 during execution of software in the computer system 151. It will be appreciated that the computer system 151 is one example of many possible computer systems which have different architectures. For example, Macintosh or Wintel systems often have multiple busses, one of which may be considered to be a peripheral bus. Network computers may also be considered to be a computer system which may be used with the present invention. Network computers may not include a hard disk or other mass storage, and the executable programs are loaded from a network connection into the memory 151 for execution by the processor 153. A Web TV system, which is known in the art, may be considered to be a computer system according to the present invention, but it may not include certain features shown in FIG. 2B, such as certain input or output devices. A cell phone having a suitable display and a processor and memory may also be considered to be a digital processing system or a computer system which may be used with the present invention. A typical computer system will usually include at least a processor, memory, and a bus coupling the memory to the processor. It will also be appreciated that the computer system 151 is typically controlled by an operating system software which includes a file management system, such as a disk operating system, which is part of the operating system software.

Figure 3:
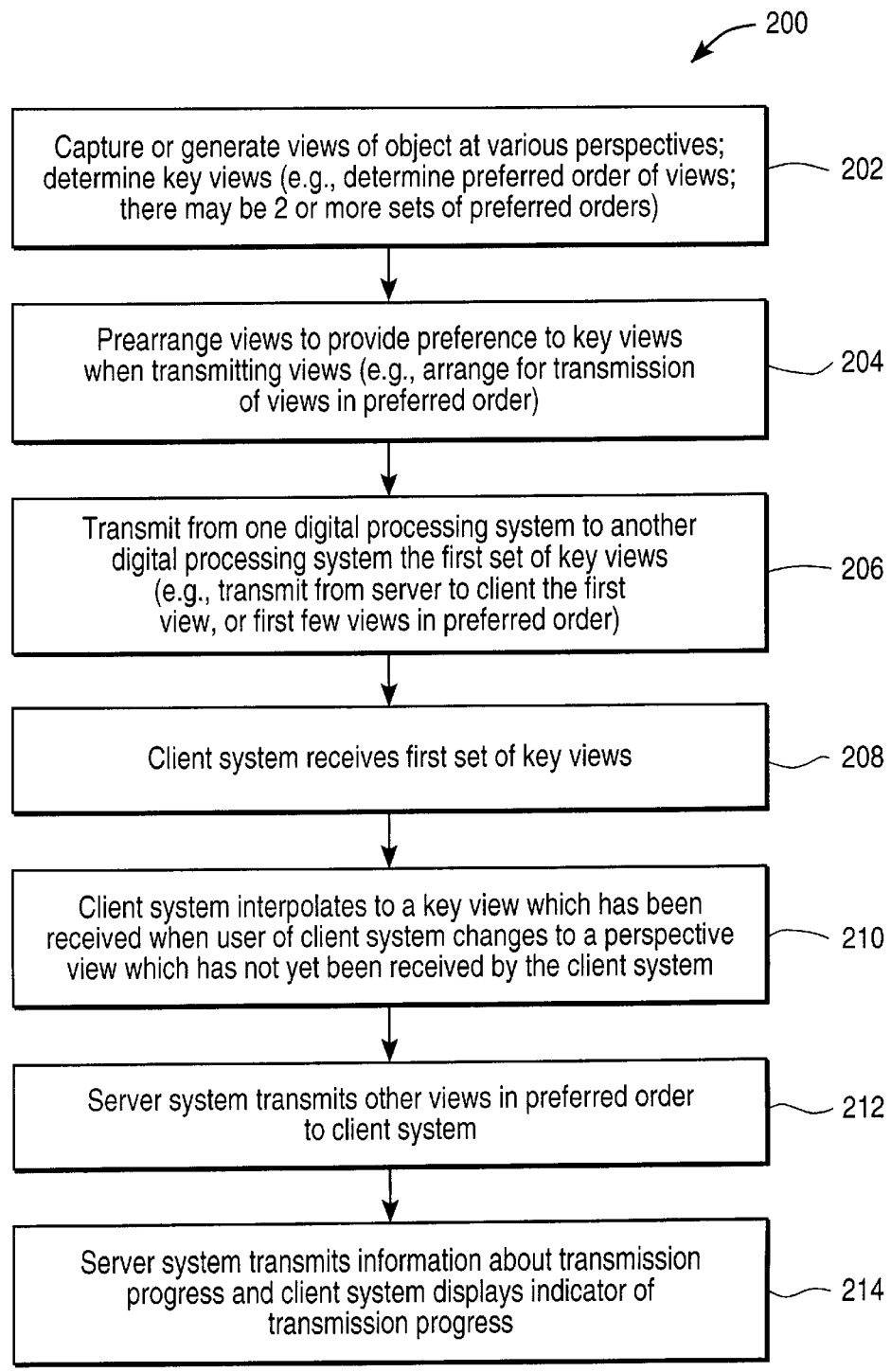
FIG. 3 shows a flowchart indicating an example of a method which may be practiced in a system having, in one example, a client and a server according to the present invention.

FIG. 3 shows an example of a method which may be performed by a transmitting system and a receiving system according to the present invention. In one embodiment, the transmitting system is a server computer system and the receiving system is a client computer system which are interconnected through the Internet. The method 200 begins in step 202 in which various different views are generated or captured for an object at various perspectives. This may involve the computer generation of various views of the object or may involve the capturing through a digital camera or an analog camera of various views of the object. Step 202 typically also includes the step of determining a preferred order for the views. In one embodiment, there may be two or more sets of preferred orders. For example, if the object is a car, the bottom views of the car may be placed in the beginning of the preferred order in one set of views having a first preferred order which is designed for car mechanics, and top and side views may be placed in the beginning of another preferred order which is designed for normal consumers and possible purchasers of the car. In step 204, the views are prearranged to provide preference to certain views, which may be referred to as key views, when transmitting the views. For example, the views are arranged for transmission in a preferred order which is based upon which views would be considered to be most important to see first by a viewer of the object. This order for transmission will typically be different than the order of playback of the various views because the order of playback of the object movie is designed to smoothly rotate the object through a continuous series of views. In step 206, one digital processing system transmits to another digital processing system the first set of key views. In one example of this method, a server computer system transmits to a client computer system the first view or first few views in the preferred order. In one example, the preferred order may begin along the equator of the virtual sphere and four views may be transmitted in the following order: a view at 0°, a view at 180°, a view at 270°, and a view at 90°. In this manner, the user, after the first four frames have arrived, is able to completely rotate the object along the equatorial plane. According to this example, the front and back views are provided first before providing the left and right view.

In step 208, the client system receives the first set of key views, and in step 210, the client system interpolates to a key view which has been received when the user of the client system manipulates the object in order to change to a perspective view which has not yet been received by the client system. Typically this involves determining the particular view which has been received which has the smallest difference in perspective angle to the desired perspective view selected by the user.

In step 212, the server computer system continues to transmit other views in the preferred order to the client system. This transmission may take any of a number of possible preferred orders depending upon the viewer preference of an anticipated user. For example, after the first four frames along the equator, additional views from the equator may be provided, or four views above or below the equator may be provided next. The server system may also transmit information about the transmission progress, in step 214, and the client system may display an indicator of the transmission progress. This step 214 may occur in a different order than shown in FIG. 3. For example, this step 214 may occur before steps 206 or 208. Step 214 provides the user of the client system with information concerning the availability of various views for the object which indicate the coverage of the views of the object, and also how many of those views have been transmitted so far and received so far and how many remain to be transmitted.

It will be appreciated that the preferred order for transmission of the views is based upon which views would be considered to be most important to see first by a viewer of the object. This "viewer" may be considered to be an ideal viewer. This viewer may, in fact, be the person who prepares the views for storage at the server and retrieval from the server and who decides, based on this person's judgment about what views are preferred, how to order the views. This preferred order of transmission is normally different than the order of playback of a movie of the views of the object.

Figure 4A:
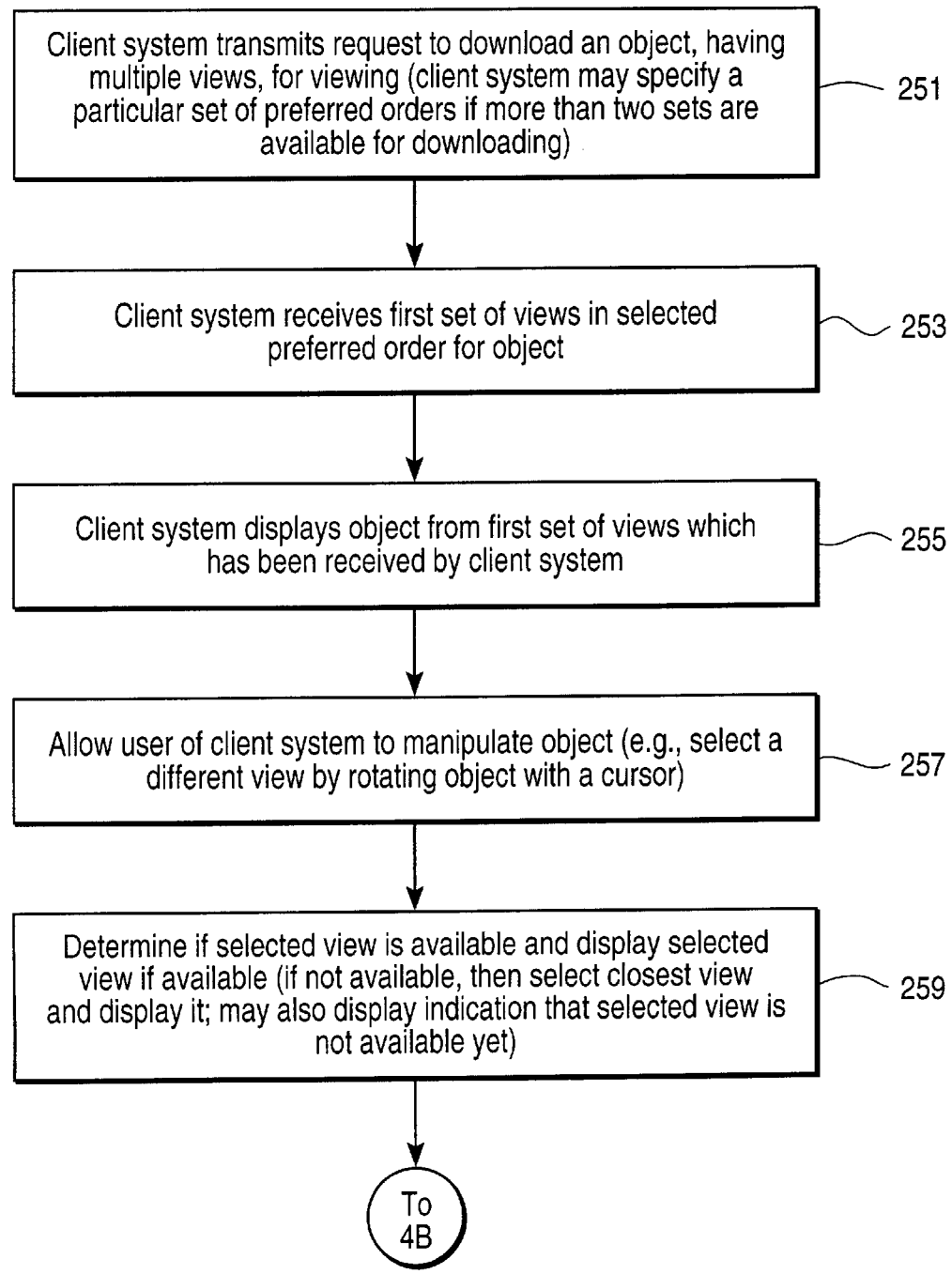
FIGS. 4A and 4B show a method which may be practiced by a receiving digital processing system, such as a client computer system.
Figure 4B:
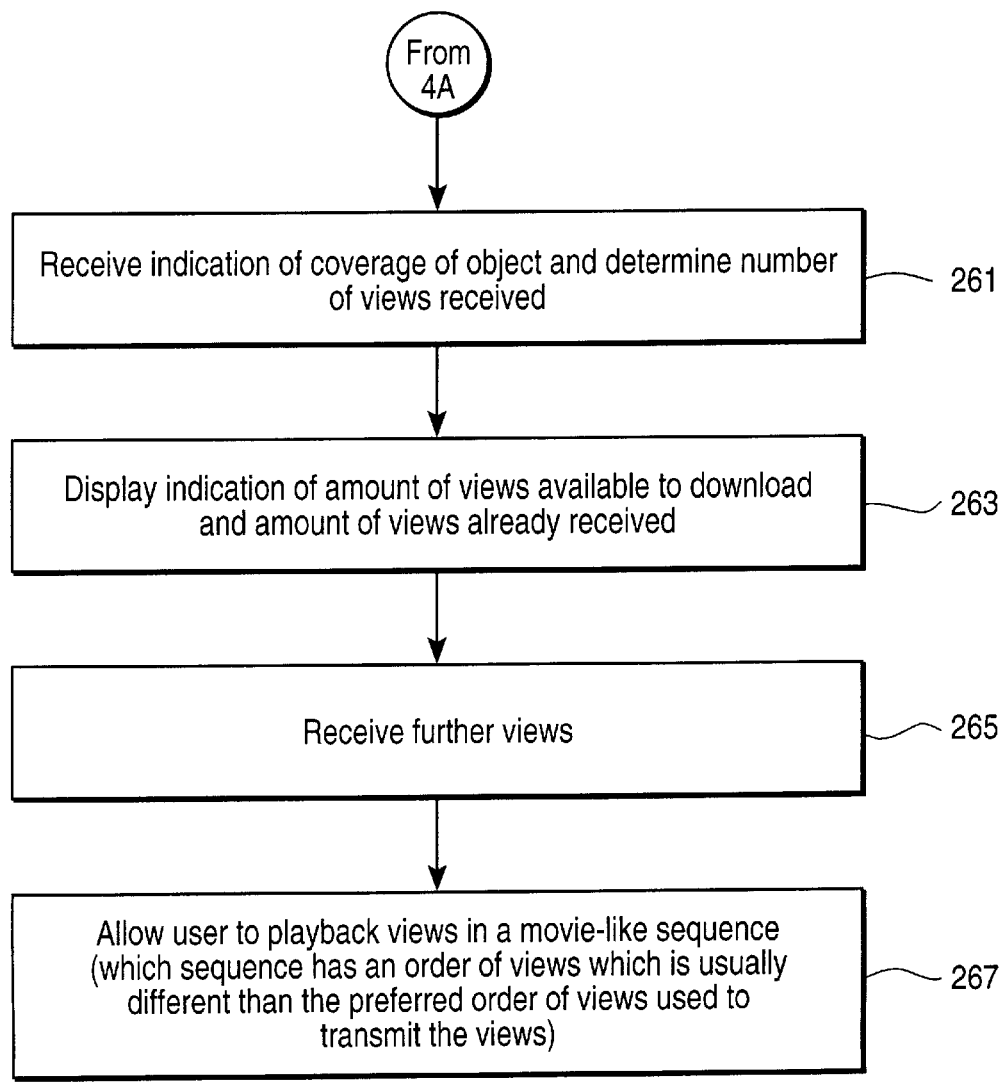

FIGS. 4A and 4B illustrate a method performed by a client system according to the present invention. It will be appreciated that various steps are shown and the particular sequence of FIGS. 4A and 4B are only for purposes of illustration. Certain of these steps may be performed in a different order, such as step 263, step 261, and step 267. The method of FIGS. 4A and 4B begins in step 251 in which the client system transmits a request to receive data representing an object which has multiple views for viewing. Typically, this transmission will be considered to be a download from a server system. The client system in one example of the present invention may specify a particular set of preferred orders if more than two sets of preferred orders are available for downloading. So, for example, if a first set of preferred order is designed to provide preference to the top and bottom views, another set of preferred orders may provide preference to the side views of the object. The client system receives a first set of views in the selected preferred order for the object. This set will typically consist of at least one view. In step 255, the client system displays on a display device, such as display 161, the object from the first set of views which has been received by the client system. The client system may, in step 257, allow the user to manipulate the object. This may occur by selecting a different view by rotating the object with the cursor. Examples of one method for manipulating an object may be found in U.S. Pat. No. 5,019,809. In step 259, the client system interpolates from the selected view to a view which is available for display. That is, the client system determines if the selected view, which was selected in step 257, is available because it has been received by the client system; if it is available, then it is displayed on a display device. If it is not available then the client system selects the closest view which matches the selected view and displays it. The client system may also display an indication that the selected view is not yet available, thereby letting the user know that the displayed view is an approximation of the requested view.

The client computer system may, in one embodiment of the invention, receive an indication of coverage of the object and determine the number of views received, as shown in step 261. The client system may also display, in step 263, an indication of the amount of views available to download and the amount of views already received. This provides the user with feedback concerning the overall coverage of the object of the different views (e.g. only the front and sides may be shown in the views which are available for downloading) and also indicates the amount of views which have currently been received and thus can be displayed accurately without approximations being used as in step 259.

The client computer system continues to receive further views as specified by the preferred order in step 265. In step 267, the client computer system may allow the user to play back views in a movie-like sequence. It will be appreciated that this movie-like sequence has an order of views which is usually different than the preferred order of views which is used to transmit the views. Typically, the preferred order of views provides a preference to overall coverage of the object from desirable viewpoints, whereas the movie-like sequence provides a playback of the object which in effect smoothly rotates the object by displaying a series of consecutive views. Thus, the preferred order of views does not provide a desirable movie-like playback.

It should also be noted that the present invention may be used with the transmission of object data from one system to another system where there is no network connection but where the transfer of data is at a slow rate. Furthermore, the present invention may be used in transferring data from a slow storage device which provides a slow data transmission rate or from a device which does not provide random access.

Figure 5:
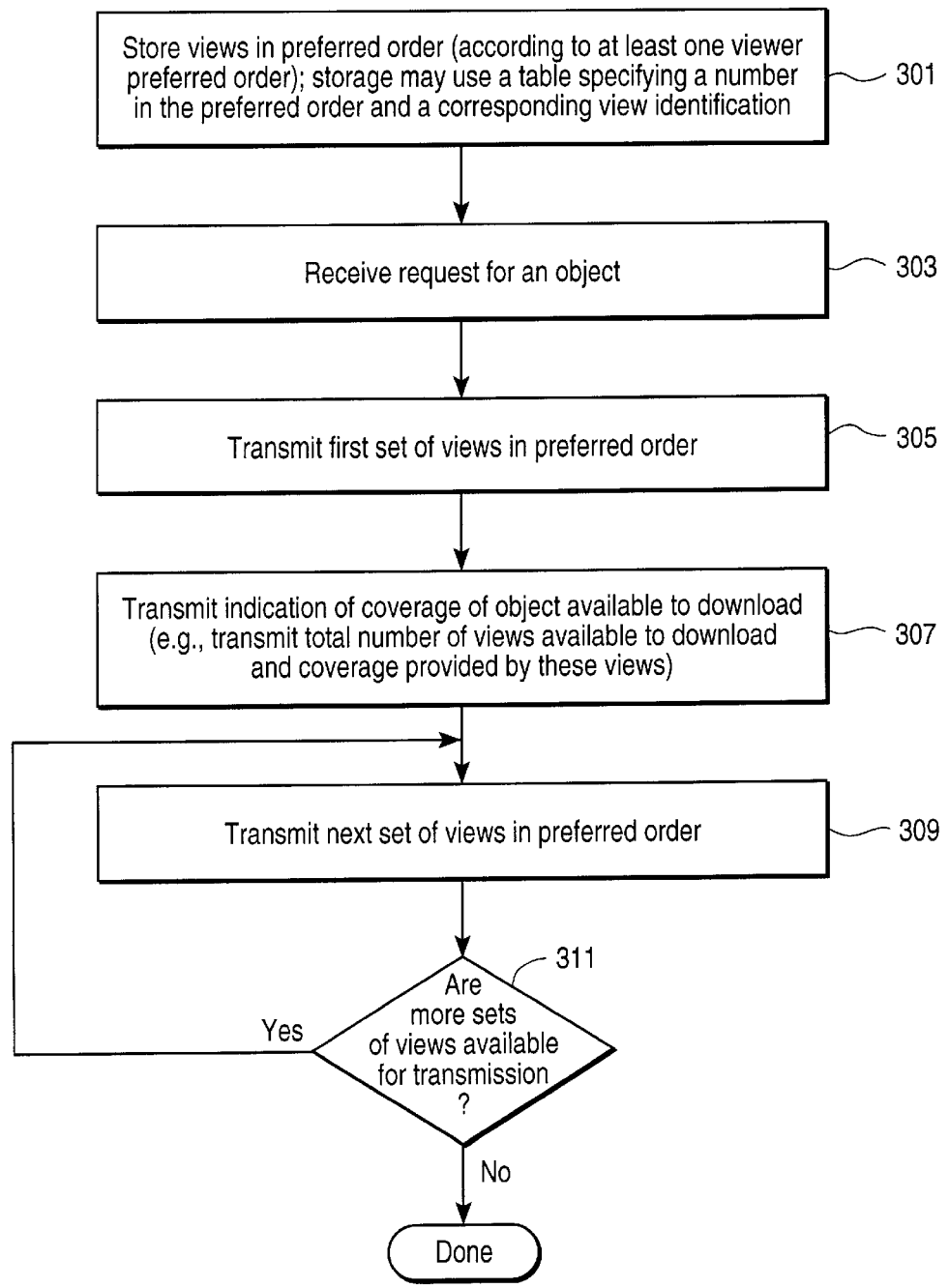
FIG. 5 illustrates a method for transmitting data according to the present invention.

FIG. 5 illustrates one example of a method which may be performed by a transmitting system of the present invention, such as a server computer system. In step 301, the various different views are stored in at least one preferred order which is determined by a viewing preference of an expected viewer. The storage may use a table specifying a number in the preferred order and a corresponding view identification, such as a file name or other identifier for the view. This allows the views to be stored in any order in a physical media but retrieved and transmitted according to the preferred order. Alternatively, the views may be stored on a physical media, such as a magnetic hard disk or other mass storage device in precisely the preferred order. In step 303, the server system receives a request for the object represented by the various views. Then in step 305, the server system transmits the first set of views in the preferred order, which will be at least one view. In step 307, the server system may transmit an indication of the coverage of the object available to download. This may involve transmitting the total number of views available to download and the coverage provided by these views. This coverage may show that the views show only the front and back rather than the sides of the object or may illustrate that only a view along the equator of a virtual sphere surrounding the object is available to download, as will be described in an example below. In step 309, the server system continues to transmit the next set of views in the preferred order. It will be appreciated that step 307 may occur at a different sequence in the method shown in FIG. 5. In step 311, the server system determines whether there are further sets of views available for transmission. If not, the system is done transmitting the views. If further views are available for transmission and have not yet been transmitted, then the system returns back to step 309 and continues to transmit the next set of views in the preferred order. Steps 309 and 311 continue until all views have been transmitted or until the server system receives an instruction to discontinue the transmission of the views.

Figure 6:
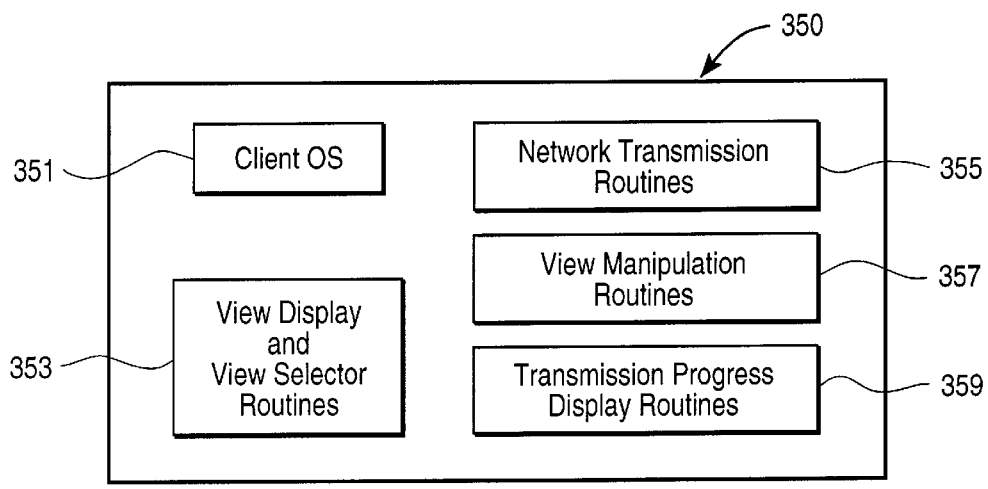
FIG. 6 shows an example of a computer readable storage medium for a client computer system which may be used with one aspect of the present invention.
Figure 7:
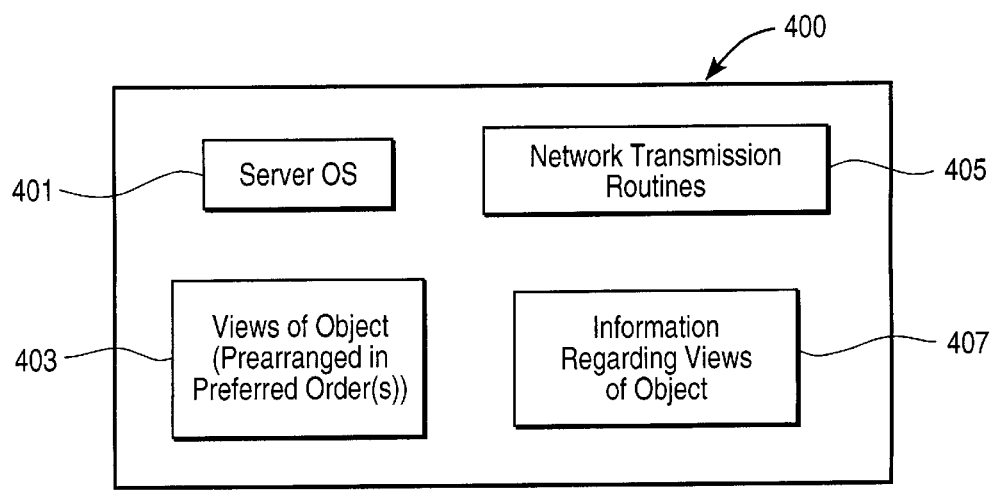
FIG. 7 shows an example of a computer readable storage medium for a server computer system which may be used with one aspect of the present invention.

FIGS. 6 and 7 illustrate an example according to one embodiment of the present invention for two different computer readable storage media. It will be appreciated that the actual memory which stores this information may be different elements, such as memory 155 and mass memory 163, or they may be the same element, such as mass memory 163. In one example of a network computer where there is no non-volatile mass storage, the necessary software files and data files may be downloaded to the memory 155 for execution in a processor of the network computer. In this case, the memory 155 provides the computer readable storage medium. In one embodiment, the client computer system or the server computer system's computer readable media may at some time be entirely stored in a nonvolatile mass memory, such as a hard disk. At other times, the various elements shown in either FIG. 6 or FIG. 7 may be dispersed between dynamic memory, such as memory 155, and a mass memory, such as memory 163.

FIG. 6 shows a client system's computer readable storage medium 350. The client system's computer readable storage medium stores executable computer program instructions which cause a client computer system to perform a method of the present invention. This medium includes software routines 351 for providing an operating system for the client. View display and view selector routines 353 provide the necessary software to display the various views and to also interpolate to a closest view when the user selects a view which has not yet been received by the client system. Network transmission routines 355 provide the various software routines necessary to transmit and receive the data, such as TCP/IP protocols. The view manipulation routines 357 include the necessary software routines to allow the user to manipulate the object in order to see various different views of the object. The transmission progress display routines 359 include the software routines which display indicators of the transmission status, such as the indicators shown in FIG. 10. The medium 350 may also include software routines which allow the playback of a sequence of views as a movie.

FIG. 7 illustrates a server system's computer readable storage medium for storing executable program instructions which cause the server computer system to perform a method of the present invention. The computer storage readable medium 400 includes a server operating system component 401 which provides an operating system for the server computer. The views of the object 403 are also stored or are accessible to the server computer system. Typically, the views of the object 403 are stored on some storage device which may be retrieved by the server computer system, and the storage is prearranged in the preferred order or orders. As noted above, this prearrangement may exist by a table which specifies the preferred order rather than by actually storing the data in the preferred order. Network transmission routines 405 provide the software which is used to transmit data from the server and to receive instructions and other data from a client system. Data component 407 includes information regarding the views about the particular object. This information may be provided to a client system in order to allow the client system to display the progress of a transmission through an indicator, such as the indicator shown in FIG. 10.

Figure 8A:
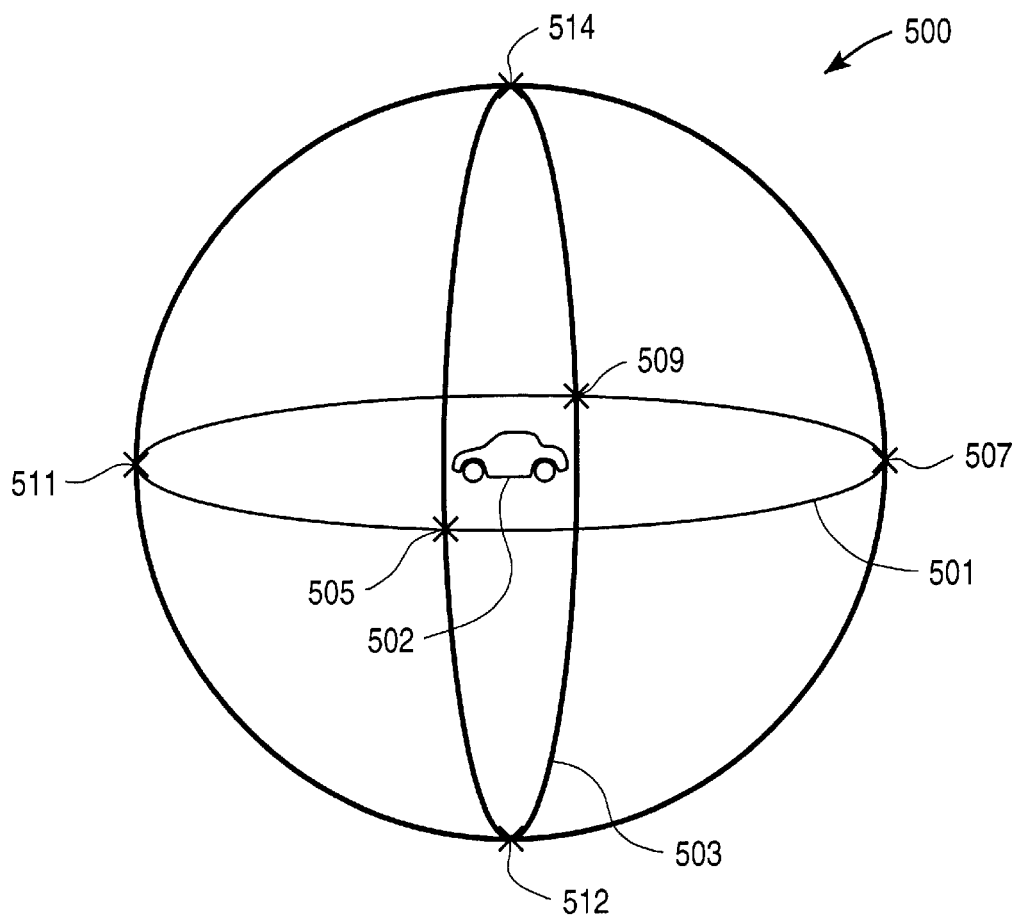
FIG. 8A shows a virtual sphere which surrounds an object which may be used with the present invention.

FIG. 8A shows another example of a virtual sphere 500 which surrounds an object 502 which is positioned at the center of the virtual sphere. In this case the object 502 represents a car. Data relating to various views of this object is captured and stored in order to provide various different views of the object. The virtual sphere 500 includes an equator 501 and two longitudinal lines 503. The ends of each of these longitudinal lines meet at the south pole 512 and the north pole 514. Four points are shown along the equator 501; these points 505, 507, 509, and 511 represent respectively the longitudes 0°, 90°, 180°, and 270°. It will be appreciated that a view from the north pole 514 will show only the top of the car while the view from the south pole 512 will show only the bottom of the car. A view from point 507 will show an equatorial view of the front of the car, while views at points 505 and 509 will show respectively the left and right sides of the car.

Figure 8B:
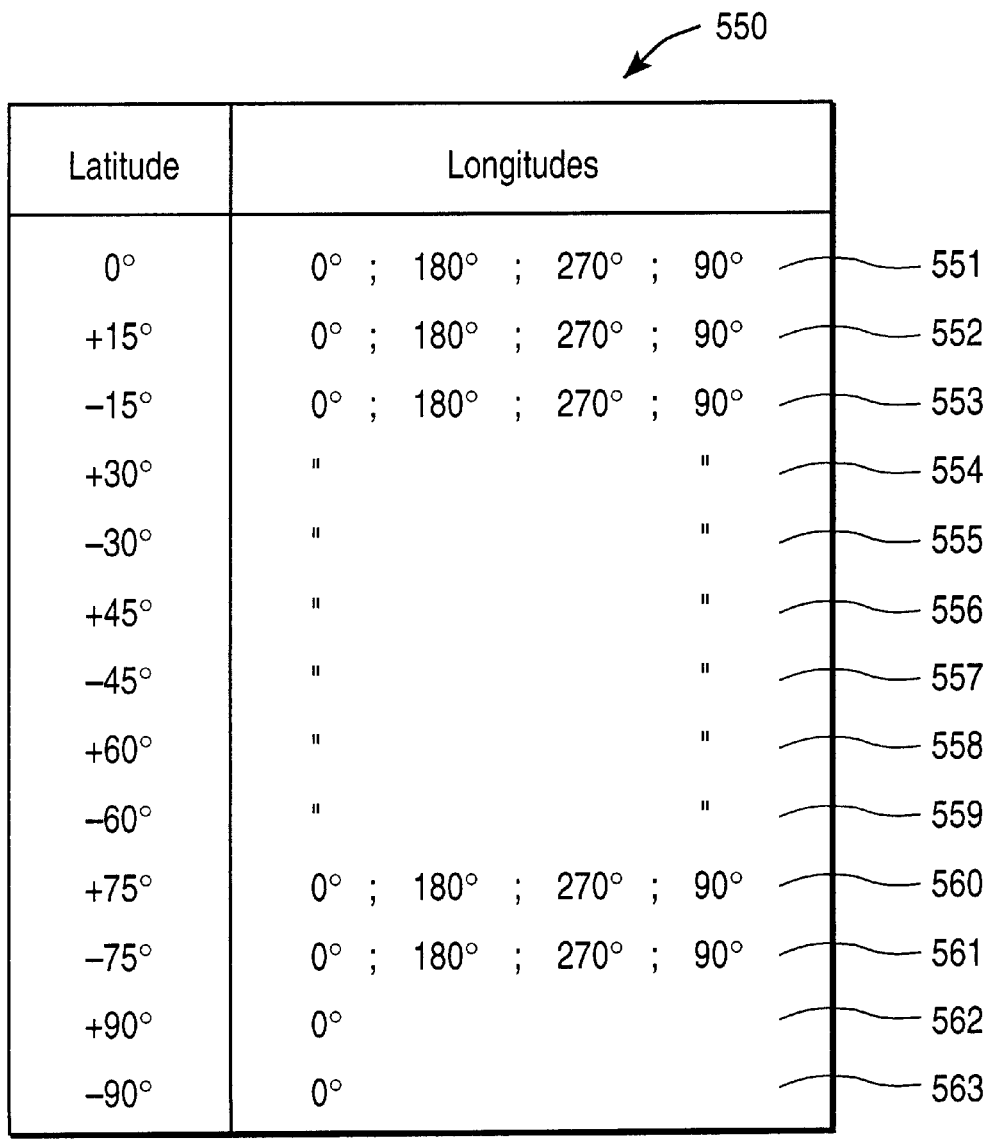
FIG. 8B shows an example of a data structure created and used according to the present invention.

FIG. 8B shows a data table 550 which specifies a preferred order according to one embodiment of the present invention for transmitting data relating to the car. In this embodiment, the two side views are provided along the equator before providing the front and back views. This is shown in row 551. In the particular example shown in FIG. 8B, the rows 551–563 specify a preferred order for downloading several latitudes at certain specific longitudes. It will be appreciated that further views may be provided thereafter at other latitudes and other longitudes in order to increase the coverage resolution which is viewable by a user at the client computer system.

Figure 9A:
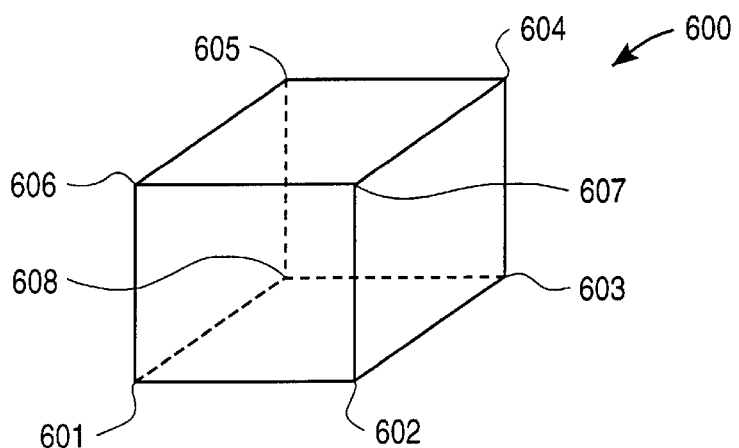
FIGS. 9A and 9B illustrate an alternative set of views which may be used with the present invention.
Figure 9B:
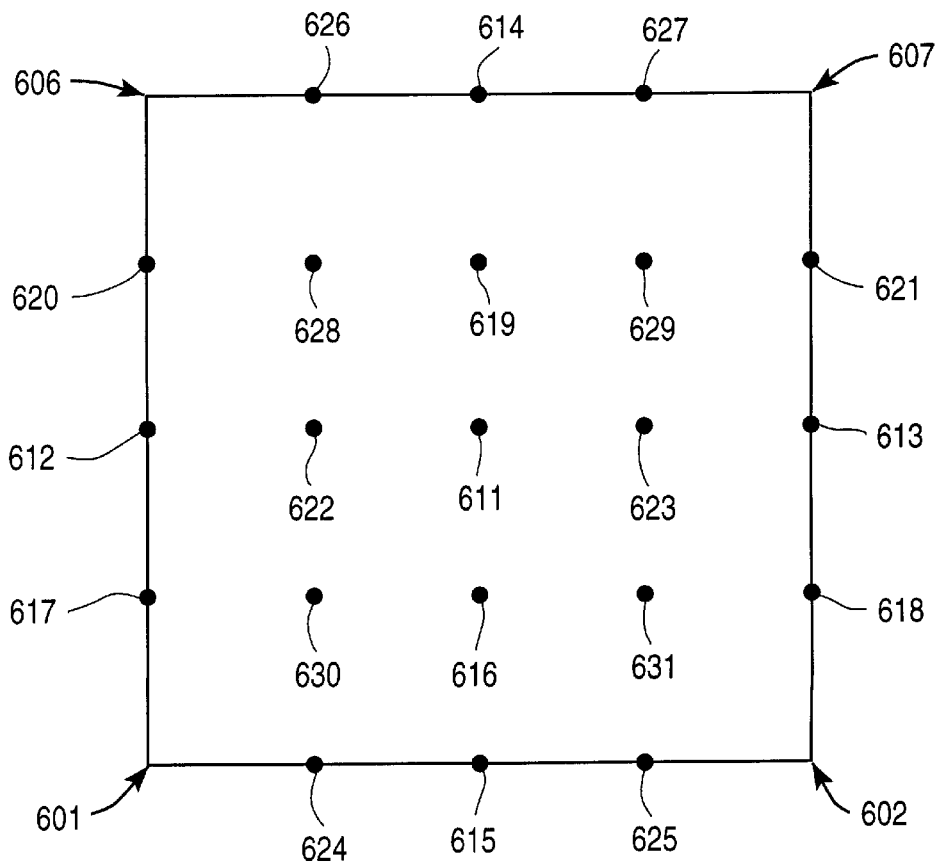

FIG. 9A and FIG. 9B represent an alternative way to provide views of an object. In this case, the object is centered in a cube having eight corners 601–608. The cube 600 may be created by photographing the object at the center of an imaginary cube by placing the camera at the locations 601–608 in order to capture eight of the corner views. In a particular example of the present invention, these eight views obtained at points 601–608 may be transmitted in the order 601–608 as a first set of views in a preferred order. FIG. 9B shows one face of the cube, the front face, and also shows various points 611–631. These reference numerals also specify the preferred order for transmitting various data for this cube face. It will also be appreciated that other alternative orders may be used. For example, the center point within each cube face may be transmitted before transmitting other data with respect to each cube face.

Figure 10:
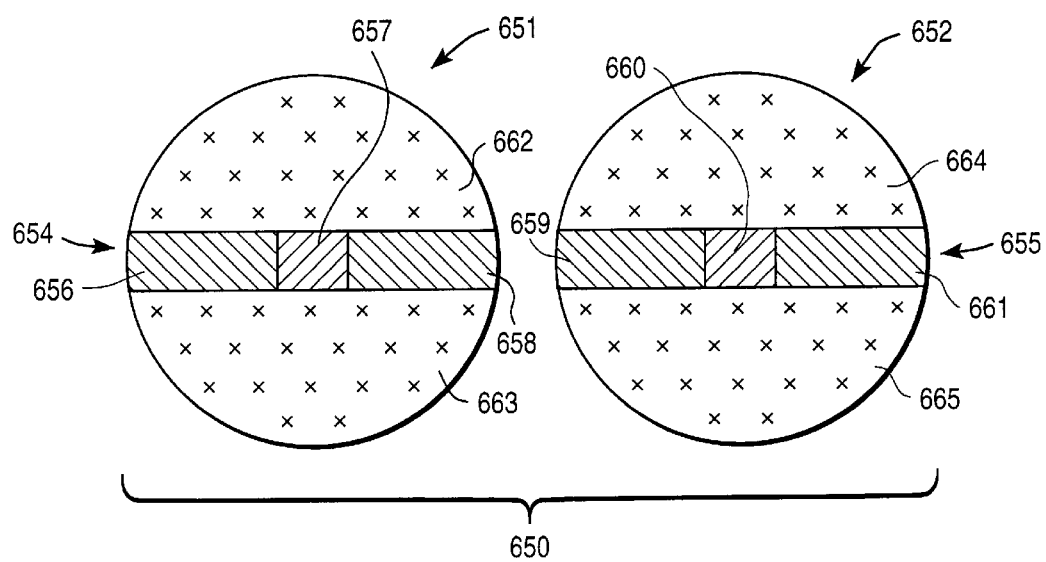
FIG. 10 shows an example of a graphical user interface for allowing a user of a client computer system to determine the status of a file transfer process.

FIG. 10 shows an example of a graphical user interface feature which may be used to indicate to the user the views which are available for downloading and which also indicates the status of the transmission process. The indicator 650 includes two circles 651 and 652 which represent the east and west hemispheres of a virtual sphere. The indicator 650 shows that views for the object in most of the northern and southern portions of each hemisphere are not available for downloading. In particular, upper region 662 and lower region 663 of the circle 651 show that views of this portion of the hemisphere are not available for downloading. Similarly, the upper portion 664 and the lower portion 665 of the circle 652 show that these portions of the hemisphere represented by the circle 652 are not available for downloading. The bars 654 and 655 indicate that the equatorial region of the virtual sphere contains views which are available for downloading. The regions 657 and 660 show that the client system has already received a middle region of the equatorial band in both hemispheres while most of the rest of the views along the equatorial band have not been transmitted as shown by the regions 656, 658, 659, and 661. As additional views get downloaded and received by the client system, the regions 657 and 660 will grow until they consume all of the equatorial bars 654 and 655. In this manner, a user may be able to see at a glance the availability of different views for an object which are available for downloading and also see the progress of the download itself. This will allow a user to decide whether or not to rotate the object in a certain direction. For example, if no views are available in a certain direction, the user will realize that rotating in that direction is not useful. This indicator 650 may be displayed separately or maybe overlaid upon the object or displayed adjacent to the object.

The foregoing description has provided numerous examples of the present invention. It will be appreciated that various modifications and changes may be made without departing from the broader spirit and scope of the invention as set forth in the appended claims.

What is claimed is:

1. A digital processing implemented method for transmitting data representing different views of an object, said method comprising:
   storing a predetermined order of views of said object according to a viewing preference of a viewer;
   transmitting said data representing said different views in said predetermined order.

2. A method as in claim 1 wherein said predetermined order is determined to provide a high degree of visibility of said object from less than all of said views.

3. A method as in claim 2 wherein said predetermined order is determined to provide a high degree of visibility from a limited number of said views.

4. A method as in claim 1 wherein each of said views represent said object at a particular perspective and wherein said viewer is a person who prepares said views for storage before transmission of said views.

5. A method as in claim 1 further comprising transmitting a representation of a total number of said different views, and wherein said data is received at a digital processing system and said total number of said different views provides an indication of how much data remains to be transmitted to said digital processing system.

6. A method as in claim 1 wherein said data is stored in a first format representing said predetermined order and is stored in a second format representing another predetermined order, and wherein said method further comprises:
   receiving a request for data in said predetermined order.

7. A method as in claim 6 wherein said predetermined order provides views in a first order consisting of a first view, a second view, and a third view, and said another predetermined order provides views in a second order consisting of a fourth view, a fifth view and a sixth view.

8. A method as in claim 1 wherein said method is performed by a server computer system.

9. A method as in claim 8 wherein said server computer system is a world-wide web server.

10. A digital processing implemented method for receiving and using data representing different views of an object, said method comprising:
    receiving a first set of views which represent at least one first predetermined view of said object;
    receiving a second set of views which represent at least one second predetermined view of said object, wherein said second set is received after said first set according to a predetermined order which is based on a viewing preference of a viewer.

11. A method as in claim 10 wherein said predetermined order is determined to provide a high degree of visibility of said object from less than all of said views.

12. A method as in claim 10 wherein each of said views represent said object at a particular perspective and wherein the order of receipt of said views is different than the order of playback, in a movie-like manner, of said views once received.

13. A method as in claim 12 further comprising transmitting a request for data in said predetermined order wherein said request specifies said predetermined order.

14. A method as in claim 12 further comprising:
    receiving a representation of a total number of said different views which provides an indication of how much data remains to be transmitted.

15. A method as in claim 12 wherein said method is performed by a digital processing system and wherein said data representing different views is received from a server computer system.

16. A method as in claim 15 further comprising:
    receiving an input which requests one of said second set of views before receiving said second set of views;
    selecting one of said first set of views and displaying said one of said first set of views in response to said input.

17. A method as in claim 16 wherein said selecting step comprises determining which of said first set of views approximates said one of said second set of views.

18. A method as in claim 14 wherein said indication is displayed on a display device.

19. A method as in claim 17 wherein said input comprises manipulating said object using a cursor which is displayed on a display device.

20. A computer readable storage medium containing executable computer program instructions which when executed cause a digital processing system to perform a method for transmitting data representing different views of an object, said method comprising:
    storing a predetermined order of views on said object according to a viewing preference of a viewer; transmitting said data representing said different views in said predetermined order.

21. A computer readable storage medium as in claim 20 wherein said predetermined order is determined to provide a high degree of visibility of said object from less than all of said views.

22. A computer readable storage medium as in claim 20 wherein each of said views represent said object at a particular perspective.

23. A computer readable storage medium as in claim 20 wherein said method further comprises transmitting a representation of a total number of said different views, and wherein said data is received at a digital processing system and said total number of said different views provides an indication of how much data remains to be transmitted to said digital processing system.

24. A computer readable storage medium as in claim 20 wherein said data is stored in a first format representing said predetermined order and is stored in a second format representing another predetermined order, and wherein said method further comprises:
    receiving a request for data in said predetermined order.

25. A computer readable storage medium as in claim 24 wherein said predetermined order provides views in a first order consisting of a first view, a second view, and a third view, and said another predetermined order provides views in a second order consisting of a fourth view, a fifth view and a sixth view.

26. A computer readable storage medium as in claim 20 wherein said digital processing system is a server computer system.

27. A computer readable storage medium containing executable computer program instructions which when executed cause a digital processing system to perform a method for receiving and using data representing different views of an object, said method comprising:
    receiving a first set of views which represent at least one first predetermined view of said object;

receiving a second set of views which represent at least one second predetermined view of said object, wherein said second set is received after said first set according to a predetermined order which is based on a viewing preference of a viewer.

28. A computer readable storage medium as in claim 27 wherein said predetermined order is determined to provide a high degree of visibility of said object from less than all of said views.

29. A computer readable storage medium as in claim 27 wherein each of said views represent said object at a particular perspective.

30. A computer readable storage medium as in claim 29 wherein said method further comprises:

transmitting a request for data in said predetermined order wherein said request specifies said predetermined order.

31. A computer readable storage medium as in claim 29 wherein said method further comprises:

receiving a representation of a total number of said different views which provides an indication of how much data remains to be transmitted.

32. A computer readable storage medium as in claim 29 wherein said method is performed by a digital processing system and wherein said data representing different views is received from a server computer system.

33. A computer readable storage medium as in claim 32 wherein said method further comprises:

receiving an input which requests one of said second set of views before receiving said second set of views;

selecting one of said first set of views and displaying said one of said first set of views in response to said input.

34. A computer readable storage medium as in claim 33 wherein said selecting step comprises determining which of said first set of views approximates said one of said second set of views.

35. A computer readable storage medium as in claim 34 wherein said input comprises manipulating said object using a cursor which is displayed on a display device.

36. A computer readable storage medium as in claim 31 wherein said indication is displayed on a display device.

37. A digital processing system for transmitting data representing different views of an object, said digital processing system comprising:

means for storing a predetermined order of views of said object according to a viewing preference of a viewer;

means for transmitting said data representing said different views in said predetermined order.

38. A digital processing system as in claim 37 wherein said predetermined order is determined to provide a high degree of visibility of said object from less than all of said views.

39. A digital processing system as in claim 37 wherein each of said views represent said object at a particular perspective.

40. A digital processing system as in claim 37 further comprising means for transmitting a representation of a total number of said different views, and wherein said data is received at a digital processing system and said total number of said different views provides an indication of how much data remains to be transmitted to said digital processing system.

41. A digital processing system as in claim 37 wherein said data is stored in a first format representing said predetermined order and is stored in a second format representing another predetermined order, and wherein said digital processing system further comprises:

means for receiving a request for data in said predetermined order.

42. A digital processing system for receiving and using data representing different views of an object, said digital processing system comprising:

means for receiving a first set of views which represent at least one first predetermined view of said object;

means for receiving a second set of views which represent at least one second predetermined view of said object, wherein said second set is received after said first set according to predetermined order which is based on a viewing preference of a viewer.

43. A digital processing system as in claim 42 wherein said predetermined order is determined to provide a high degree of visibility of said object from less than all of said views.

44. A digital processing system as in claim 42 wherein each of said views represent said object at a particular perspective.

45. A digital processing system as in claim 44 further comprising:

means for transmitting a request for data in said predetermined order wherein said request specifies said predetermined order.

46. A digital processing system as in claim 44 further comprising:

means for receiving a representation of a total number of said different views which provides an indication of how much data remains to be transmitted.

47. A digital processing system as in claim 44 further comprising:

means for receiving an input which requests one of said second set of views before receiving said second set of views;

means for selecting one of said first set of views and displaying said one of said first set of views in response to said input.

48. A digital processing system as in claim 47 wherein said means for selecting comprises means for determining which of said first set of views approximates said one of said second set of views.

49. A digital processing system as in claim 48 wherein said input comprises means for manipulating said object using a cursor which is displayed on a display device.

* * * * *